United States Patent Office
3,185,739
Patented May 25, 1965

3,185,739
CONVERSION OF CYCLOTRIENE COMPOUNDS
Roy A. Gray and John E. Mahan, Bartlesville, Okla., assignors to Phillips Petroleum Company, a corporation of Delaware
No Drawing. Filed May 19, 1960, Ser. No. 30,084
15 Claims. (Cl. 260—666)

This invention relates to the conversion of cyclotriene compounds. In one aspect this invention relates to novel polycyclic hydrocarbons prepared by the conversion of cyclotriene compounds. In another aspect this invention relates to a process for converting cyclotriene compounds to polycyclic hydrocarbons containing from one to two carbon to carbon double bonds per molecule. In another aspect this invention relates to novel saturated polycyclic hydrocarbons. In another aspect this invention relates to a method of operating a continuous combustion-type power plant using said novel hydrocarbons as fuel.

It has recently been disclosed by G. Wilke in Angew Chem. 69, 397–8 (1957) that butadiene can be trimerized in 80 percent yield to trans,trans, cis-1,5,9-cyclododecatriene. This trimerization is carried out by means of a catalyst system comprising an organoaluminum such as triethylaluminum in conjunction with a metal halide such as $TiCl_4$. The cyclic triene formed boils at 100–101° C. at 11 mm. Hg absolute pressure. Thus, this synthesis represents a method for preparing a 12-carbon compound from a compound of much lower molecular weight.

We have now discovered that cyclotrienes prepared by trimerizing 1,3-butadiene, or related compounds such as isoprene and piperylene, can be converted to novel polycyclic hydrocarbons containing the same number of carbon atoms as said starting cyclotriene. In one specific embodiment of the invention, we have discovered that trans,trans,cis-1,5,9-cyclododecatriene can be converted to novel polycyclic hydrocarbons containing from one to two carbon to carbon double bonds per molecule, and to novel saturated polycyclic hydrocarbons, containing the same number of carbon atoms as said cyclododecatriene. In another specific embodiment of the invention, we have discovered that said novel polycyclic hydrocarbons containing said carbon to carbon double bonds can be hydrogenated to form novel saturated polycyclic hydrocarbons. We have also discovered that said novel polycyclic hydrocarbons, unsaturated and/or saturated, are excellent fuels for jet engines and other continuous combustion type power plants.

Thus, broadly speaking, the present invention resides in: a mixture of novel polycyclic hydrocarbons consisting essentially of polycyclic hydrocarbons containing one carbon to carbon double bond per molecule, polycyclic hydrocarbons containing two carbon to carbon double bonds per molecule, and saturated polycyclic hydrocarbons; methods of preparing said mixture of polycyclic hydrocarbons; another novel mixture of polycyclic hydrocarbons prepared by hydrogenating said first mixture of polycyclic hydrocarbons to saturate said hydrocarbons containing said carbon to carbon double bonds; and methods of using said mixtures of polycyclic hydrocarbons, unsaturated and/or saturated, in continuous combustion type power plants.

An object of this invention is to provide a mixture of novel polycyclic compounds consisting essentially of polycyclic hydrocarbons containing one carbon to carbon double bond per molecule, polycyclic hydrocarbons containing two carbon to carbon double bonds per molecule, and saturated polycyclic hydrocarbons. Another object of this invention is to provide a process for preparing said mixture of novel polycyclic compounds by conversion of cyclotriene compounds. Still another object of this invention is to provide another mixture of novel polycyclic hydrocarbons prepared by hydrogenating said first mixture polycyclic hydrocarbons to saturate said hydrocarbons containing said carbon to carbon double bonds. Still another object of this invention is to provide a method of operating a continuous combustion-type power plant, such as a jet engine, using said novel polycyclic hydrocarbons, unsaturated and/or saturated, as the fuel.

Thus, according to the invention, there is is provided a mixture of polycyclic hydrocarbons characterized by: a density at 20° C. within the range of about 0.9283 to about 0.955; a refractive index $n_D^{20}$ within the range of about 1.4957 to about 1.5132; boiling within the range of about 225 to about 250° C.; and consisting essentially of polycyclic hydrocarbons containing one carbon to carbon double bond per molecule, polycyclic hydrocarbons containing two carbon to carbon double bonds per molecule, and saturated polycyclic hydrocarbons.

Further according to the invention, there is provided a process for converting a cyclotriene compound to a mixture of polycyclic hydrocarbons each containing the same number of carbon atoms as said starting cyclotriene hydrocarbon, said mixture consisting essentially of polycyclic hydrocarbons containing one carbon to carbon double bond, polycyclic hydrocarbons containing two carbon to carbon double bonds per molecule, and saturated polycyclic hydrocarbons, which process comprises: contacting said cyclotriene compound under isomerizing conditions with an isomerization catalyst selected from the group consisting of concentrated sulfuric acid, an acid of phosphorus supported on a solid absorbent, polyphosphoric acid, boron trifluoride, and boron trifluoride hydrates; and recovering said polycyclic hydrocarbons from the resulting reaction mixture.

Still further according to the invention, there is provided a method of preparing another mixture of novel polycyclic hydrocarbons, which process comprises hydrogenating said first named mixture of novel polycyclic hydrocarbons each containing the same number of carbon atoms as said starting cyclotriene hydrocarbon, in the presence of a reduced metal hydrogenation catalyst, at a temperature within the range of zero to 300° C., and under a pressure within the range of atmospheric to 3,000 p.s.i.a., and recovering the resulting saturated hydrocarbons Still further according to the invention, there is provided a method of operating a continuous combustion-type power plant, which method comprises introducing a mixture of the novel polycyclic hydrocarbons of the invention, unsaturated and/or saturated, into a combustion zone of said engine, and burning said hydrocarbons.

Suitable isomerization catalysts which can be employed in the practice of the invention are concentrated sulfuric acid containing from 70 to 90 percent by weight of $H_2SO_4$, an acid of phosphorus adsorbed on a solid absorbent, polyphosphoric acids, boron trifluoride, and boron trifluoride hydrates.

Said catalysts comprising an acid of phosphorus supported on a solid adsorbent can be prepared by any suitable method known to those skilled in the art. According to one method, a solid adsorbent material is mixed with an acid of phosphorus which can be present in an amount of 30 to 80 percent or more of the resulting mixture. Said resulting mixture is calcined at a temperature of about 450 to about 510° C. to cause extensive dehydration of said acid and hardening of the composite particles, and is then partially rehydrated by treatment with water and/or steam at a temperature lower than that employed in the calcining step, e.g., from about 200 to about 260° C.

Any suitable acid of phosphorus can be used in the preparation of said supported phosphoric acid catalysts.

Acids of phosphorus wherein the phosphorus has a valence of five are usually preferred. Orthophosphoric acid ($H_3PO_4$) is usually most preferred due to its cheapness and ready availability. Orthophosphoric acids containing from approximately 85 to 100 percent, or acid containing some free phosphorus pentoxide may be used.

Any suitable solid adsorbent material can be employed as the adsorbent or carrier for said acid of phosphorus. The adsorbents of a predominantly siliceous character such as diatomaceous earth, kieselguhr, porous silica such as for example, Sil—O—Cel, etc. are generally preferred. Another class of solid adsorbent materials which can be employed, either alone or in conjunction with said predominantly siliceous materials, include the adsorbents which are predominantly aluminum silicates, such as the naturally occurring substances including the various fuller's earths and clays such as bentonite, montmorillonite, etc. The various acid treated aluminum silicates, of which the product Tonsil is representative, are also included.

The polyphosphoric acid catalysts of the invention can be prepared by any suitable manner known to those skilled in the art. One method for preparing said catalysts comprises mixing phosphorus pentoxide with orthophosphoric acid in desired amounts and heating the resulting mixture. While any suitable polyphosphoric acid can be employed in the practice of the invention, said acids having a water to phosphorus pentoxide mol ratio within the range of from 1.5:1 to 2.25:1 are generally preferred.

As used herein and in the claims, unless otherwise specified, the term "boron trifluoride hydrates" includes $BF_3 \cdot H_2O$, $BF_3 \cdot 2H_2O$, and $BF_3 \cdot 3H_2O$.

In the practice of the invention, said isomerization catalysts are usually employed in a weight ratio of catalyst to cyclotriene compound being isomerized within the range of from 0.1:1 to 10:1, preferably within the range of 0.5:1 to 2:1, based on the total weight of catalyst and cyclotriene compound.

The conversion process of the invention can be carried out in the presence or absence of a suitable solvent. Any organic solvent which is a solvent for the triene compound being converted and the reaction products, and which is chemically inert under the isomerization conditions, can be employed in the practice of the invention. Examples of suitable organic solvents include, among others, the following: low boiling hydrocarbons such as normal pentane, normal hexane, cyclohexane, normal octane and others; the chlorinated hydrocarbons such as chloroform, carbon tetrachloride, tetrachloroethane, etc.; and the low molecular weight carboxylic acids such as acetic acid, propionic acid and butyric acid. The solution of hydrocarbon in solvent should be liquid under the conditions at which the conversion process is being carried out. The use of a solvent aids in controlling the reaction temperature and in suppressing undesired side reactions such as alkylation.

When a solvent is employed, the amount of said solvent is usually employed in a solvent to triene weight ratio up to 4:1, preferably in a ratio within the range of about 0.25:1 to about 4:1.

The conversion process of the invention is usually carried out at a temperature within the range of from about 0 to about 250° C. Said process is carried out as a liquid phase operation, normally at about atmospheric pressure, although superatmospheric pressures can be utilized, if the reaction conditions warrant, to maintain the reaction mixture in liquid phase. The reaction time will generally be within the range of from 1 to 200 minutes, the shorter times being utilized at the higher reaction temperatures and vice versa.

The process can be carried out either as a batch or a continuous operation. When solid catalysts are employed, such as the acids of phosphorus adsorbed on a solid adsorbent material, it is preferred to employ such catalysts in a continuous process. One method of carrying out the conversion process in a continuous manner is to pass the cyclic triene to be converted through a bed of catalyst in a manner well known to those skilled in the art. In such continuous processes, the weight hourly space velocity will be within the range of from 0.03 to 600 grams of cyclic triene per hour per gram of catalyst, preferably within the range of 0.15 to 120.

Trans,trans,cis-1,5,9-cyclododecatriene has the following structural formula:

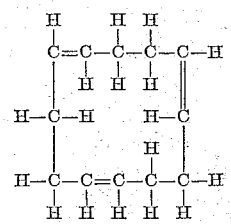

The conversion of trans,trans,cis-1,5,9-cyclododecatriene, a monocyclic hydrocarbon containing three double bonds per molecule, in accordance with the invention yields bicyclic hydrocarbons containing two carbon to carbon double bonds per molecule, tricyclic hydrocarbons containing one carbon to carbon double bond per mole, and saturated tetracyclic hydrocarbon, all having the empirical formula $C_{12}H_{18}$. Thus the said products are all true isomers of said cyclododecatriene.

In the converson process of the invention the predominant reaction is isomerization. Thus, herein and in the claims, the reaction conditions are referred to as isomerizing catalysts or isomerization catalysts. However, during the course of the isomerization reaction some hydrogen transfer occurs between compounds having activated hydrogen atoms and compounds having reactive unsaturated groupings. In other words, compounds having activated hydrogen atoms give up hydrogen atoms and compounds having reactive unsaturated groupings receive hydrogen atoms, so that the net gain or loss of hydrogen atoms in the system is zero. This results in the formation of some products containing a greater number or a smaller number of hydrogen atoms than the starting cyclotriene compound. For example, a bicyclic diene product having an empirical formula of $C_{12}H_{18}$ is converted, in part, to a bicyclic monoolefin having an empirical formula of $C_{12}H_{20}$. Similarly, a saturated tetracyclic product having an empirical formula of $C_{12}H_{18}$ is converted, in part, to a tetracyclic monoolefin having an empirical formula of $C_{12}H_{16}$.

Thus the products of the conversion process of the invention as applied to trans,trans,cis-1,5,9-cyclododecatriene comprise bicyclic hydrocarbons containing two carbon-to-carbon-double bonds per molecule and having an empirical formula of $C_{12}H_{18}$, tricyclic hydrocarbons containing one carbon-to-carbon double bond per molecule and having an empirical formula of $C_{12}H_{18}$, saturated tetracyclic hydrocarbons having an empirical formula of $C_{12}H_{18}$, bicyclic hydrocarbons containing one carbon-to-carbon double bond per molecule and having an empirical formula of $C_{12}H_{20}$, and tetracyclic hydrocarbons containing one carbon-to-carbon double bond per molecule and having an empirical formula of $C_{12}H_{16}$. The major portion or predominant part of said products are the monounsaturated polycyclic hydrocarbons. Infrared and ultraviolet analyses of products obtained in the following examples show that the products of the process of the invention contain no alkyl side chains, no vinyl groups, and no aromatic rings.

Said conversion products of the invention can be hydrogenated to novel saturated polycyclic compounds by contacting the reaction mixture with hydrogen in the presence of a hydrogenation catalyst which is suitable for the reduction of olefinic carbon-to-carbon double bonds. Generally speaking, the hydrogenation can be carried out at pressures within the range of from about atmospheric to about 3,000 p.s.i.a., and at temperatures within the range of 0 to 300° C. Preferred catalysts are the reduced metals such as platinum, palladium, and nickel, both supported and unsupported varieties. If desired said reaction mixture can be dissolved in a suitable solvent prior to hydrogenation. Low boiling hydrocarbons such as normal pentane, normal hexane, cyclohexane, normal octane and others can be used as solvents. Preferred solvents are the low molecular weight organic acids such as acetic acid and propionic acid, and the low molecular weight alcohols such as methanol and ethanol which have been acidified with an acid such as hydrochloric acid or sulfuric acid.

Isoprene and piperylene (1,3-pentadiene) can also be trimerized in the same manner as 1,3-butadiene to yield cyclic trimers. The trimers of both of said dienes will be trimethylcyclododecatrienes. In the case of the isoprene trimer, each of the three methyl groups will be attached to a carbon atom which is attached to one adjacent carbon atom by a carbon to carbon double bond. The piperylene trimer will have each of the three methyl groups attached to a carbon atom which is attached to adjacent carbon atoms by single bonds. Said trimethylcyclododecatrienes can be converted in the same manner, as described above and elsewhere herein, as trans,trans,cis-1,5,9-cyclododecatriene to obtain a mixture of corresponding polycyclic hydrocarbons having empirical formulas of $C_{15}H_{24}$, $C_{15}H_{26}$, and $C_{15}H_{22}$. Said conversion products of said trimethylcyclododecatrieines contain no vinyl groups or aromatic rings. Said last-mentioned products can also be hydrogenated to produce the corresponding saturated polyyclic hydrocarbons.

In one presently preferred method for carrying out the conversion process of the invention, the acid catalyst is placed in the reaction vessel and the cyclotriene compound to be converted is added slowly thereto, with agitation. It is desirable to provide suitable means for controlling the reaction temperature since in many instances the reaction is exothermic. If the reaction is carried out as a batch process, stirring can be continued for a desired period of time after the addition of the cyclotriene compound while maintaining the reaction mixture at the desired reaction temperature. If a solvent is employed, said solvent is usually added to the catalyst prior to the addition of the cyclotriene compound. In continuous processes, said solvent can be combined with the cyclotriene compound and the resulting mixture passed over a bed of isomerization catalyst. After completion of the contacting of the cyclotriene compound with the catalyst, the isomerizate, comprising isomers of the cyclic triene compound being isomerized, is then recovered from the resulting reaction mixture.

The following examples will serve to further illustrate the invention. However, it is to be understood that said examples are included for illustrative purposes only and are not to be construed as unduly limiting the invention. The trans,trans,cis-1,5,9-cyclododecatriene used in the following examples was prepared by the method of Wilke. This material had a density at 20° C. of 0.904, a refractive index of $n_D^{20}=1.5082$, and boiled at 100–101° C. at 11 mm. Hg pressure.

As used herein and in the claims, unless otherwise specified, the term "density" refers to the density in grams per cc. as determined at 20° C.; also, one "hydrogen equivalent" is the amount of hydrogen required to reduce one "carbon to carbon" double bond, calculated on the basis that the compound being reduced had a molecular weight of 162 ($C_{12}H_{18}$).

EXAMPLE I

A run was carried out in which trans,trans,cis-1,5,9-cyclododecatriene was isomerized in the presence of sulfuric acid. Sixty grams of 80% by weight aqueous sulfuric acid was charged to a flask, and to this acid was added 60 grams of said cyclododecatriene. During the addition of the cyclododecatriene, the reaction mixture was stirred and cooled to maintain the temperature below 30° C. The cyclododecatriene was added dropwise over a 30 minute period, and stirring was continued for an additional 30 minutes after all of the cyclododecatriene had been added. Water was then added to the reaction mixture to dilute the acid, and cooling was utilized to maintain the temperature below 20° C. At this time the reaction mixture was extracted with n-pentane and the resulting phases were separated. The organic phase was then washed with 10% by weight aqueous sodium hydroxide to neutralize any remaining acid. The organic phase from this washing step was then dried over calcium chloride, the pentane removed by stripping, and the residue then distilled. The overhead product from this distillation, a mixture of isomers of cyclododecatriene and hydrogen transfer products of said isomers, boiling from 35 to 45° C. at 0.1 mm. Hg pressure, amounted to 31.0 grams, and had a density at 20° C. of 0.9515 and a refractive index of $n_D^{20}=1.5100$.

Hydrogenation of a sample of said overhead product at 22° C. and 745 mm. mercury absolute hydrogen pressure over platinum catalyst in ethanol was carried out, and said sample was observed to absorb 0.42 equivalent of hydrogen. A similar hydrogenation in acetic acid at 25° C. and 740 mm. mercury absolute pressure was carried out, since some double bonds which are difficult to reduce in ethanol can be readily reduced in acetic acid. In this hydrogenation, said product was observed to absorb 1.28 equivalents of hydrogen.

A larger scale hydrogenation run was carried out in which another sample of said overhead product was hydrogenated at 20 p.s.i.g. hydrogen for 6 hours at room temperature. This run was carried out in acetic acid, and the hydrogenated material which resulted had a density at 20° C. of 0.9356 and a refractive index of $n_D^{20}=1.4957$. The gas chromatography retention time of one of the components in this hydrogenated material was consistent with the retention time of bicyclo-[6.4.0]-dodecane.

EXAMPLE II

Another run was carried out in which trans,trans,cis-1,5,9-cyclododecatriene was contacted with a catalyst comprising phosphoric acid on kieselguhr. The acid catalyst which was used in this run had a particle size of 8–20 mesh and contained 61–65% by weight $P_2O_5$ and 4–5% by weight water. In carrying out this run, 25 ml. of the phosphoric acid on kieselguhr catalyst and 25 ml. of cyclododecatriene which was identical to that in Example I were charged to a flask and heated together at atmospheric pressure and a temperature of 130–170° C. for approximately one hour. At the end of this time, the reaction mixture was cooled to about room temperature, and the catalyst was removed by filtration. The catalyst was then washed with n-pentane, and the pentane extract was added to the filtrate. The pentane layer was extracted with 10% by weight aqueous sodium hydroxide to remove any residual acid. The hydrocarbon phase was then dried over calcium chloride, the pentane was removed by stripping, and the hydrocarbon was distilled. Eighteen grams of overhead product boiling from 35 to 45° C. at 0.1 mm. Hg pressure were obtained. This overhead product had a density at 20° C. of 0.9532.

Hydrogenation of a sample of said overhead product in acetic acid at 740 mm. mercury absolute hydrogen pressure and 23° C. over platinum catalyst was carried out. The hydrocarbon was observed to absorb 1.0 equivalent of hydrogen.

EXAMPLE III

A larger scale isomerization run was carried out according to the procedure of Example II, utilizing 32.4 grams of cyclododecatriene and 25 ml. of the phosphoric acid on kieselguhr catalyst. The products obtained were C$_{12}$ hydrocarbons having a density at 20° C. of 0.9532 and a refractive index of $n_D^{20}=1.5132$. Hydrogenation of this material in acetic acid under the conditions previously used was carried out, and it was observed that 1.0 equivalent of hydrogen was absorbed by the cyclododecatriene conversion products.

A larger scale hydrogenation of said cyclododecatriene conversion products, carried out at 20 p.s.i.g. for 6 hours in acetic acid, and in the presence of platinum catalyst, resulted in a saturated material having a density at 20° C. of 0.9384 and a refractive index of $n_D^{20}=1.4966$.

In another hydrogenation of said cyclododecatriene conversion products, carried out at 1500 p.s.i.a. and 190–200° C., and in the presence of a nickel on kieselguhr catalyst, resulted in a saturated material having a density at 20° C. of 0.9385 and a refractive index of $n_D^{20}=1.4960$.

EXAMPLE IV

In still another run, trans,trans,cis-1,5,9-cyclododecatriene was isomerized over polyphosphoric acid. The polyphosphoric acid catalyst which was utilized in the following runs was prepared by mixing together 30.6 grams of $P_2O_5$ and 19.5 ml. of 85% by weight $H_3PO_4$ and heating the resulting mixture over a steam bath for 3 hours. The resulting catalyst had a mol ratio of $H_2O$ to $P_2O_5$ of 2.13 to 1.

In this run, all of the catalyst as prepared was charged to a flask and heated to 90° C. While stirring, 25 ml. of said cyclododecatriene was added to the acid catalyst dropwise over a 15 minute period. After all of the cyclododecatriene had been added, the resulting mixture was stirred at or slightly above 90° C. for an additional 30 minutes. The reaction mixture was then cooled to room temperature and water was added. The resulting mixture was then extracted with n-pentane, and, after separating the phases, the pentane layer was washed with 10% aqueous sodium hydroxide. The pentane layer from this washing was then dried over calcium chloride, following which the pentane was stripped off and the remaining hydrocarbon was distilled. Fourteen ml. of overhead product boiling from 35 to 45° C. at 0.1 mm. Hg pressure was obtained, and 8 grams of a viscous residue remained in the distillation column.

Hydrogenation of said overhead product at 25° C. and 738 mm. mercury absolute hydrogen pressure over platinum catalyst and in acetic acid solution was carried out. The product was observed to absorb 0.79 equivalent of hydrogen.

EXAMPLE V

An additional amount of polyphosphoric acid catalyst was prepared by the same procedure described above, and contacted with 50 grams of trans,trans,cis-1,5,9-cyclododecatriene at 95–115° C. in the manner previously described. After the product was worked up in the same manner, 31.0 grams of overhead product boiling from 35 to 45° C. at 0.1 mm. Hg pressure were obtained; this material having a density at 20° C. of 0.9497 and a refractive index of $n_D^{20}=1.5113$. An acetic acid solution of a sample of said overhead product was hydrogenated over platinum catalyst at 27° C. and 741 mm. mercury absolute hydrogen pressure. The product was observed to absorb 0.96 equivalent of hydrogen.

In a larger scale hydrogenation, an acetic acid solution of another sample of said overhead product was hydrogenated at 20 p.s.i.g. hydrogen pressure for 6 hours over a platinum catalyst. The resulting saturated material had a density at 20° C. of 0.9373 and a refractive index of $n_D^{20}=1.4970$.

The products from the above conversion runs were analyzed by infrared and ultraviolet light. Based on the results of these analyses, it is apparent that the compounds resulting from the acid-catalyzed isomerization of cyclododecatriene contain no alkyl side chains, no vinyl groups and no aromatics.

Analysis by gas chromatography of the mixture of products from the above isomerization runs, before and after hydrogenation, revealed that the retention times of some of the components in said mixture were not altered by hydrogenation, indicating they did not absorb hydrogen. However, the major portion of the components had different retention times after hydrogenation, indicating they did absorb hydrogen. Based on the concentration of the component absorbing hydrogen, and the amount of hydrogen consumed, the major portion of the components were monoolefins.

EXAMPLE VI

A run was carried out in which trans,trans,cis-1,5,9-cyclododecatriene was isomerized in the presence of $BF_3$ hydrate. In this run, $BF_3$ was bubbled into a flask containing 50 ml. of n-hexane and 5 ml. water, with stirring, until the water appeared to be saturated with $BF_3$. At this time 30 grams of cyclododecatriene identical to that of the previous examples, was added dropwise over a one-hour period. The reaction was exothermic, so it was necessary to cool the reaction mixture to maintain the temperature below 30° C. during the addition. Cold water was then added to the mixture, after which the resulting mixture was extracted with n-pentane. The pentane layer was then separated and washed with sodium bicarbonate solution. The organic layer was then washed with water, dried over calcium chloride, and the pentane removed by stripping.

Distillation under reduced pressure yielded 15.6 grams of overhead product boiling from 35 to 45° C. at 0.1 mm. mercury absolute pressure. Based on the 30 gram charge of cyclododecatriene, this represents a yield of 52% of product. The non-distillable residue in the fractionator kettle amounted to 11.4 grams.

Hydrogenation of a 0.221 gram sample of said isomerized product in ethanol at 741 mm. mercury absolute hydrogen pressure and 24° C. over a platinum catalyst resulted in the absorption of 0.19 equivalent of hydrogen. Hydrogenation of an acetic acid solution of the product at the same conditions resulted in the absorption of 0.63 equivalent of hydrogen.

The chromatogram from a gas chromatograph analysis of said products showed them to be essentially the same as those from the sulfuric acid-catalyzed isomerization. The only difference noted in the products is that the concentration of various individual isomers was slightly different from that resulting from the run employing sulfuric acid.

An infrared analysis of said products also showed them to be very similar to the products obtained from the sulfuric acid-catalyzed isomerization. The density at 20° C. of the product from this $BF_3$ hydrate-catalyzed isomerization was 0.955 gram per cc. The refractive index was $n_D^{20}=1.5076$.

EXAMPLE VII

Another run was carried out in which trans,trans,cis-1,5,9-cyclododecatriene was isomerized over the phosphoric acid on kieselguhr catalyst of Example II. In this run a solvent was employed.

In this run, 50 grams of cyclododecatriene, 50 grams of the phosphoric acid on kieselguhr catalyst of Example II, and 50 grams of n-octane were charged to a reaction vessel and maintained for 2½ hours at 140° C. At the end of this time, the catalyst was filtered out, washed with n-pentane, and the wash material was added to the reaction products. The pentane and n-octane were then removed by stripping and the remaining material was subjected to distillation at reduced pressure. The yield of overhead product boiling from 35 to 45° C. at 0.1 mm. Hg pressure was 41.0 grams while 5.5 grams of heavy residue remained in the pot.

Hydrogenation of a 0.215 gram sample of said overhead product in acetic acid at 750 mm. Hg abs. $H_2$ pressure at 25° C. and over Pt catalyst caused the absorption of 35 ml. of $H_2$. This is 1.0 equivalent of hydrogen.

The above phosphoric acid catalyst was reused in two more runs by the same procedure. No decrease in yield of converted product resulted.

EXAMPLE VIII

Twenty ml. of diethylaluminum chloride was dissolved in 600 ml. of n-heptane and charged to a 2-liter, 3-necked flask equipped with a stirrer, dropping funnel, condenser, and rubber diaphragm. This solution was blanketed with $N_2$, and 4 ml. of $TiCl_4$ was added dropwise through said diaphragm by means of a syringe. The solution turned brown, and a brown precipitate was obtained. The suspension was then warmed to 40° C. by means of a water bath, and maintained at this temperature on a hot plate controlled by a thermocouple relay.

Three hundred and five ml. of isoprene was added dropwise to the catalyst suspension at 40° C. over a 5 hour period. After all of the isoprene had been added, the reaction mixture was stirred for an additional 7 hours at 40° C. At the end of this time, approximately 50 ml. of isopropyl alcohol was added to decompose the catalyst.

The reaction mixture was then poured into approximately 1500 ml. acetone, and the resulting mixture was filtered through diatomaceous earth (Celite). The filtrate obtained was stripped of acetone, isopropyl alcohol and most of the n-heptane, after which the remainder of said filtrate was distilled through a 1" x 15" packed column to obtain the following fractions.

*Distillation*

| Cut | Pot temp., °C. | Head temp., °C. | Press, mm. Hg absolute | Volume, ml. |
|---|---|---|---|---|
| 1 | 130 | 50 | 10 | 10 |
| 2 | 124 | 50 | 3 | 10 |
| 3 | 123 | 50 | 1.0 | 5 |
| 4 | 123 | 62 | 0.5 | 6.5 |
| 5 | 125–30 | 70–80 | 0.5 | 27 |
| 6 | 170 | 110 | 0.4 | 82 |

Note.—Residue=55 grams.

Fractions 5 and 6 were combined, washed with dilute aqueous $H_2SO_4$, dried, and redistilled.

*Redistillation*

| Cut | Pot temp., °C. | Head temp., °C. | Press. mm. Hg absolute | Volume, ml. | Refractive index $n_D^{20}$ |
|---|---|---|---|---|---|
| A | 109 | 35 | 0.3 | 3 | Not meas. |
| B | 123 | 65 | 0.3 | 10 | 1.5006 |
| C | 123 | 64 | 0.1 | 5 | Not meas. |
| D | 123 | 68 | 0.1 | 10 | 1.5085 |
| E | 124 | 68 | 0.1 | 15 | 1.5093 |
| F | 131 | 69.5 | 0.1 | 29 | 1.5113 |
| G | 150 | 71 | 0.1 | 19 | 1.5125 |
| H | 160 | 80 | 0.1 | 5 | 1.5160 |

Note.—Residue=7.5 grams.

The boiling point, refractive indices, and hydrogenation data of cuts E, F, and G indicate that the product was 1,5,9-trimethylcyclododecatriene.

Thirty grams of a mixture of cuts F and G, 30 grams of n-octane, and 30 grams of the phosphoric acid on kieselguhr catalyst of Example II were charged to a distillation flask equipped with a reflux condenser. The mixture was heated to boiling and refluxed for 2½ hours. The reaction mixture was then cooled to room temperature, and the catalyst was filtered out. The n-octane was distilled off, and upon continued distillation 24.2 grams of overhead product was recovered between 45 and 55° C. at approximately 0.1 to 0.2 mm. Hg absolute pressure. Said overhead product had a refractive index $n_D^{20}$ of 1.5045. The density of 20° C. of this product was 0.9348 g./ml.

Hydrogenation of 0.222 gram of said overhead product in acetic acid solution at 25° C. and 744 mm. Hg absolute $H_2$ pressure over a platinum catalyst was carried out. The amount of hydrogen absorbed was 25.5 ml., which corresponds to one equivalent of hydrogen, calculated for a molecular weight of 204.

In a larger scale hydrogenation of said overhead product, 10 grams was hydrogenated in acetic acid solution over a platinum catalyst. This hydrogenation was carried out in a Parr hydrogenator at 20 p.s.i.g. for approximately 8 hours at 25° C. The catalyst was then filtered out, and water was added to the filtrate. Pentane was then added and shaken with the acetic acid solution of hydrogenated isomerizate to extract the hydrocarbons. The pentane layer was then separated and dried over $CaCl_2$. Removal of the pentane with a rotary evaporator yielded a colorless liquid having a very pleasant odor. Infrared analysis of this material showed only the bands for C—H bonds and methyl groups. No double bonds were detected. The density of this hydrogenated product at 20° C. was 0.9283.

The isomers produced by said conversion of trimethylcyclododecatriene have the same number of carbon atoms and hydrogen atoms as said starting material and thus have the same empirical formula, $C_{15}H_{24}$. Similarly, the hydrogenated isomers have the empirical formula, $C_{15}H_{26}$. Said isomers corresponds to, or are analogous to the isomers obtained in the conversion of trans,trans,cis-1,5,9-cyclododecatriene. As in the isomerization of said cyclododecatriene, some hydrogen transfer occurs. Thus the products of the conversion process of the invention as applied to said trimethylcyclododecatriene comprises bicyclic hydrocarbons containing two carbon to carbon double bonds and having an empirical formula of $C_{10}H_{24}$, tricyclic hydrocarbons containing one carbon to carbon double bond per molecule and having an empirical formula of $C_{15}H_{24}$, saturated tetracyclic hydrocarbons having an empirical formula of $C_{15}H_{24}$, bicyclic hydrocarbons containing one carbon to carbon double bond per molecule and having an empirical formula of $C_{15}H_{26}$, and tetracyclic hydrocarbons containing one carbon to carbon double bond per molecule and having an empirical formula of $C_{15}H_{22}$. The major portion or predominant part of said products are the monounsaturated polycyclic hydrocarbons.

The conversion products of trimethylcyclododecatriene and the hydrogenated conversion products were each burned in a bomb calorimeter to determine their heats of combustion. The results of these tests are summarized below.

TABLE

| Product | Density, g./cc. at 20° C. | Net heat of combustion, B.t.u./gallon |
|---|---|---|
| Conversion products of trimethylcyclododecatriene | 0.9348 | 141,217 |
| Hydrogenated conversion products | 0.9283 | 141,287 |

The products obtained in the isomerization runs of the above Examples I, III and V, and said products after hydrogenation, were analyzed for carbon and hydrogen content. The results of these analyses were as follows:

| | Carbon content, wt. percent | Hydrogen content, wt. percent |
|---|---|---|
| Example I: | | |
| Product | 88.2 | 11.4 |
| Hydrogenated product | 87.3 | 12.3 |
| Example III: | | |
| Product | 88.4 | 11.0 |
| Hydrogenated product | 87.5 | 12.3 |
| Example V: | | |
| Product | 88.1 | 11.0 |
| Hydrogenated product | 87.4 | 12.3 |
| Trans,trans,cis-1,5,9-cyclododecatriene ($C_{12}H_{18}$) | *88.9 | *11.1 |
| $C_{12}H_{20}$ | *87.8 | *12.2 |

*Calculated values.

The above data show that the carbon and hydrogen values for the products of the isomerization runs agree very well with the calculated values for $C_{12}H_{18}$. The analyses of the hydrogenated products agree very well with calculated values for $C_{12}H_{20}$.

As indicated above, the conversion products of the invention are useful as fuels for jet engines and other continuous combustion type power plants. The advent of turbojet engines, ramjets and liquid rocket engines has resulted in the development and commercialization of several grades of jet fuels, most of which are kerosene grade hydrocarbons. The most widely used grade is currently designated as JP-4, although other grades such as JP-6 have been employed at various times. These relatively cheap hydrocarbon fuels have, in general, proved to be satisfactory to date, but it would be very desirable if higher density hydrocarbons of essentially the same burning characteristics were available.

The development of supersonic aircraft with ultrathin wing sections has practically eliminated the use of internal wing space for the storage of fuel. This limitation seriously hampers the range of high speed aircraft since only a certain number of gallons of fuel can be stored in the fuselage. Thus, if higher density hydrocarbons with essentially the same heat of combustion in B.t.u.'s per pound were available, a tank of given volume could store many more B.t.u.'s, and more thrust would be available.

The conversion products of the invention have extremely high densities for hydrocarbons of their molecular weight and also possess very high heats of combustion. Thus, as an added feature of this invention, said products, and their hydrogenated derivatives, are each excellent fuels for jet engines and other continuous combustion type power plants. The following example illustrates this superiority of the conversion products of the invention as compared to typical conventional JP-4 and JP-6 jet fuels.

EXAMPLE IX

The heat of combustion of the products obtained in the isomerization runs of the above Examples I, III and V, and said isomers after hydrogenation, were determined in a bomb calorimeter. The results of these determinations were as follows:

| Fuel [1] | Density, grams/ml. | Boiling range, 760 mm. Hg, °C. | Refractive index, $n_D^{20}$ | Net heat of combustion, B.t.u./gallon |
|---|---|---|---|---|
| A | 0.9532 | 225–250 | 1.5132 | 142,745 |
| B₁ | 0.9384 | 225–250 | 1.4966 | 142,858 |
| B₂ | 0.9385 | 225–250 | 1.4960 | 143,400 |
| C | 0.9497 | 225–250 | 1.5113 | 142,916 |
| D | 0.9373 | 225–250 | 1.4970 | 142,463 |
| E | 0.9515 | 225.250 | 1.5100 | 142,929 |
| F | 0.9356 | 225–250 | 1.4957 | 142,233 |
| JP-4 [2] | | | | 119,885 |
| JP-6 [2] | | | | 125,300 |

[1] A = Conversion product mixture from Example III.
B₁ = Conversion product mixture from Example III, hydrogenated, Pt catalyst.
B₂ = Conversion product mixture from Example III, hydrogenated, Ni catalyst.
C = Conversion product mixture from Example V.
D = Conversion product mixture from Example V, hydrogenated.
E = Conversion product mixture from Example I.
F = Conversion product mixture from Example I, hydrogenated.
[2] Typical commercial jet fuels.

In the operation of jet engines and other continuous combustion type power plants, a hydrocarbon fuel and air are introduced into the combustion zone of said power plants at a fuel to air weight ratio in the range of from 0.005 to 0.10. Turbojet engines are preferably operated at an over-all fuel to air weight ratio between 0.01 and 0.03. The exact fuel to air ratio which is utilized in any given continuous combustion type power plant will depend upon design limitations, such as turbine durability and the like, as will be understood by those skilled in the art. The air supplied to a turbo jet engine will generally have an air inlet pressure between about 40 and about 500 inches of mercury absolute and will have a linear air velocity of from about 30 to about 200 feet per second. The fuel supplied to the combustor will usually have a temperature of between about −60° F. and about 350° F. The air is usually supplied to the combustor at a temperature between about −30 and about 900° F., more frequently between 100 and 760° F. Fuel injection temperature will be dependent upon fuel characteristics such as freezing point and volatility as well as injection nozzle characteristics. In the operation of turbojet engines, air for the combustion zone is supplied from a compressor, and the resulting combustion gases from the combustion zone are passed through a turbine and out of a rearwardly extending exhaust duct at an exit velocity higher than the flying speed of said engine so as to impart thrust thereto. The power developed by said turbine is utilized to drive said compressor and other auxiliaries of said engine.

While certain embodiments of the invention have been described for illustrative purposes, the invention obviously is not limited thereto. Various other modifications of the invention will be apparent to those skilled in the art in view of the above disclosure. Such modifications are within the scope and spirit of the invention.

We claim:

1. A mixture of polycyclic hydrocarbons characterized by: a density at 20° C. within the range of about 0.9283 to about 0.955; a refractive index $n_D^{20}$ within the range of about 1.4957 to about 1.5132; boiling within the range of about 35 to about 55° C. at about 0.1 to 0.2 mm. of Hg pressure; and consisting essentially of bicyclic hydrocarbons containing two carbon to carbon double bonds per molecule, tricyclic hydrocarbons containing one carbon to carbon double bond per molecule, saturated tetracyclic hydrocarbons, bicyclic hydrocarbons containing one carbon to carbon double bond per molecule, and tetracyclic hydrocarbons containing one carbon to carbon double bond per molecule; said hydrocarbons having an average empirical formula selected from the group consisting of $C_{12}H_{18}$ and $C_{15}H_{24}$.

2. A mixture of polycyclic hydrocarbons characterized by: a density at 20° C. within the range of about 0.9283 to about 0.955; a refractive index $n_D^{20}$ within the range of about 1.4957 to about 1.5132; boiling within the range of about 35 to about 45° C. at 0.1 mm. of Hg pressure; and consisting essentially of bicyclic hydrocarbons containing two carbon to carbon double bonds per molecule and having an empirical formula of $C_{12}H_{18}$, tricyclic hydrocarbons containing one carbon to carbon double bond per molecule and having an empirical formula of $C_{12}H_{18}$, saturated tetracyclic hydrocarbons having an empirical formula of $C_{12}H_{18}$, bicyclic hydrocarbons containing one carbon to carbon double bond per molecule and having an empirical formula of $C_{12}H_{20}$, and tetracyclic hydrocarbons containing one carbon to carbon double bond per molecule and having an empirical formula of $C_{12}H_{16}$.

3. A mixture of polycyclic hydrocarbons characterized by: a density at 20° C. of about 0.9348; a refractive index $n_D^{20}$ of about 1.5045; boiling within the range of about 45 to about 55° C. at about 0.1 to 0.2 mm. of Hg pressure; and consisting essentially of bicyclic hydrocarbons containing two carbon to carbon double bonds per molecule and having an empirical formula of $C_{15}H_{24}$, tricyclic hydrocarbons containing one carbon to carbon double bond per molecule and having an empirical formula of $C_{15}H_{24}$, saturated tetracyclic hydrocarbons having an empirical formula of $C_{15}H_{24}$, bicyclic hydrocarbons containing one carbon to carbon double bond per molecule and having an empirical formula of $C_{15}H_{26}$, and tetracyclic hydrocarbons containing one carbon to carbon double bond per molecule and having an empirical formula of $C_{15}H_{22}$.

4. A process for converting a cyclotriene hydrocarbon having an empirical formula selected from the group consisting of $C_{12}H_{18}$ and $C_{15}H_{24}$ to a mixture of polycyclic hydrocarbons each containing the same number of carbon atoms as said starting cyclotriene hydrocarbon, said mixture consisting essentially of polycyclic hydrocarbons containing one carbon to carbon double bond per molecule, polycyclic hydrocarbons containing two carbon to carbon double bonds per molecule, and saturated polycyclic hydrocarbons, which process comprises: contacting said cyclotriene under isomerizing conditions with an isomerization catalyst selected from the group consisting of concentrated sulfuric acid, an acid of phosphorus supported on a solid adsorbent, polyphosphoric acid, boron trifluoride, and boron trifluoride hydrates; and recovering said polycyclic hydrocarbons from the resulting reaction products.

5. A process according to claim 4 wherein said cyclotriene is contacted with said catalyst in the presence of an organic solvent which is a solvent for said cyclotriene and said reaction products and which is chemically inert under said isomerizing conditions.

6. A process for converting trans,trans,cis-1,5,9-cyclododecatriene to a mixture of polycyclic hydrocarbons each containing the same number of carbon atoms as said starting cyclotriene hydrocarbon, said mixture consisting essentially of polycyclic hydrocarbons containing one carbon-to-carbon double bond per molecule, polycyclic hydrocarbons containing two carbon-to-carbon double bonds per molecule, and saturated polycyclic hydrocarbons, which process comprises: contacting said cyclotriene under isomerizing conditions with an isomerization catalyst selected from the group consisting of concentrated sulfuric acid, an acid of phosphorus supported on a solid adsorbent, polyphosphoric acid, boron trifluoride, and boron trifluoride hydrates; and recovering said polycyclic hydrocarbons from the resulting reaction products.

7. A process for isomerizing trans,trans,cis-1,5,9-cyclododecatriene to a mixture of polycyclic hydrocarbons each containing the same number of carbon atoms as said starting cyclotriene hydrocarbon, said mixture consisting essentially of bicyclic hydrocarbons containing two carbon-to-carbon double bonds per molecule and having an empirical formula of $C_{12}H_{18}$, tricyclic hydrocarbons containing one carbton-to-carbon double bond per molecule and having an empirical formula of $C_{12}H_{18}$, saturated tetracyclic hydrocarbons having an empirical formula of $C_{12}H_{18}$, bicyclic hydrocarbons containing one carbon-to-carbon double bond per molecule and having an empirical formula of $C_{12}H_{20}$, and tetracyclic hydrocarbons containing one carbon-to-carbon double bond per molecule and having an empirical formula of $C_{12}H_{16}$, which process comprises: contacting said cyclotriene hydrocarbon with an isomerization catalyst selected from the group consisting of concentrated sulfuric acid, an acid of phosphorus supported on a solid adsorbent, polyphosphoric acid, boron trifluoride, and boron trifluoride hydrates, at a temperature within the range of 0 to 250° C., under a pressure sufficient to maintain liquid phase conditions, for a period of time within the range of 1 to 200 minutes, and recovering said polycyclic hydrocarbons from the resulting reaction products.

8. A process for isomerizing trans,trans,cis-1,5,9-trimethylcyclododecatriene to a mixture of polycyclic hydrocarbons each containing the same number of carbon atoms as said starting cyclotriene hydrocarbon, said mixture consisting essentially of polycyclic hydrocarbons containing one carbon-to-carbon double bond per molecule, polycyclic hydrocarbons containing two carbon-to-carbon double bonds per molecule, and saturated polycyclic hydrocarbons, which process comprises: contacting said cyclotriene under isomerizing conditions with an isomerization catalyst selected from the group consisting of concentrated sulfuric acid, an acid of phosphorus supported on a solid adsorbent, polyphosphoric acid, boron trifluoride, and boron trifluoride hydrates; and recovering said polycyclic hydrocarbons from the resulting reaction products.

9. A process according to claim 8 wherein said cyclotriene is contacted with said catalyst in the presence of an organic solvent, which is a solvent for said cyclotriene and said reaction products and which is chemically inert under said isomerizing conditions.

10. A process for isomerizing trans,trans,cis-1,5,9-trimethylcyclododecatriene to a mixture of polycyclic hydrocarbons each containing the same number of carbon atoms as said starting cyclotriene hydrocarbon, said mixture consisting essentially of bicyclic hydrocarbons containing two carbon-to-carbon double bonds per molecule and having an empirical formula of $C_{15}H_{24}$, tricyclic hydrocarbons containing one carbon-to-carbon double bond per molecule and having an empirical formula of $C_{15}H_{24}$, saturated tetracyclic hydrocarbons having an empirical formula of $C_{15}H_{24}$, bicyclic hydrocarbons containing one carbon-to-carbon double bond per molecule and having an empirical formula of $C_{15}H_{26}$, and tetracyclic hydrocarbons containing one carbon-to-carbon double bond per molecule and having an empirical formula of $C_{15}H_{22}$, which process comprises: contacting said cyclotriene hydrocarbon with an isomerization catalyst selected from the group consisting of concentrated sulfuric acid, an acid of phosphorus supported on a solid adsorbent, polyphosphoric acid, boron trifluoride, and boron trifluoride hydrates, at a temperature within the range of 0 to 250° C., under a pressure sufficient to maintain liquid phase conditions, for a period of time within the range of 1 to 200 minutes, and recovering said polycyclic hydrocarbons from the resulting reaction products.

11. The process of claim 4 wherein said isomerization catalyst is concentrated sulfuric acid.

12. The process of claim 4 wherein said isomerization catalyst is an acid of phosphorus supported on a solid adsorbent.

13. The process of claim 4 wherein said isomerization catalyst is polyphosphoric acid.

14. The process of claim 4 wherein said isomerization catalyst is boron trifluoride.

15. The process of claim 4 wherein said isomerization catalyst is a hydrate of boron trifluoride.

References Cited by the Examiner

UNITED STATES PATENTS

| | | | |
|---|---|---|---|
| 2,220,693 | 11/40 | Peski et al. | 260—683 |
| 2,422,653 | 6/47 | Breese et al. | 158—117.5 |
| 2,449,095 | 9/48 | Wheeler et al. | 208—162 |
| 2,472,720 | 6/49 | Nagel | 158—117.5 |
| 2,569,092 | 9/51 | Deering | 260—683.65 |
| 2,623,076 | 12/52 | Roebuck et al. | 260—666 |
| 2,754,337 | 7/56 | Chirtel et al. | 260—666 |
| 2,765,617 | 10/56 | Glusenkamp et al. | 260—667 |
| 3,009,001 | 11/61 | Crain et al. | 260—666 |
| 3,011,003 | 11/61 | Wilke et al. | 260—666 |
| 3,012,961 | 12/61 | Weisz | 208—15 |

FOREIGN PATENTS 555,180   8/57   Belgium.

OTHER REFERENCES

Cram et al.: Synthesis and Properties of 1,7-Cyclododecandiyne and Related Compounds, Journal of the American Chemical Society, vol. 78, pp. 2518–24 relied on, 1956.

ALPHONSO D. SULLIVAN, *Primary Examiner.*

ALLAN M. BOETTCHER, PAUL M. COUGHLAN, JR., *Examiners.*